United States Patent [19]

Agawa

[11] Patent Number: 4,954,205
[45] Date of Patent: Sep. 4, 1990

[54] JOINING DEVICE FOR CORD-REINFORCED BELT-SHAPED MATERIALS

[75] Inventor: Jiro Agawa, Nagasaki, Japan

[73] Assignee: Mitsubishi Jukogyo Kabushiki Kaisha, Tokyo, Japan

[21] Appl. No.: 293,841

[22] Filed: Jan. 5, 1989

[30] Foreign Application Priority Data

Jan. 7, 1988 [JP] Japan .................................. 63-620

[51] Int. Cl.$^5$ ............................................. B29D 30/30
[52] U.S. Cl. .................................... 156/502; 156/134; 156/304.1
[58] Field of Search ...................... 156/502, 507, 304.1, 156/157, 134

[56] References Cited

U.S. PATENT DOCUMENTS 3,933,565  1/1976  Printz et al. ..................... 156/502 X
4,054,495  10/1977  Botasso et al. ....................... 156/157

FOREIGN PATENT DOCUMENTS 0248412  12/1987  European Pat. Off. ......... 156/304.1
63-1531  6/1988  Japan .
1376400  12/1974  United Kingdom .

*Primary Examiner*—Raymond Hoch
*Attorney, Agent, or Firm*—Wenderoth, Lind & Ponack

[57] ABSTRACT

The present invention is drawn to an improvement in a joining device for joining ends of cord reinforced belt-shaped materials, in which elastic belt-shaped material having a large number of cords embedded therein at equal intervals with a predetermined inclination is cut in the direction of the cords into a length somewhat shorter than an outer circumferential length of a drum to be fed with the belt-shaped material, the cut length being wrapped around the outer circumference of the drum, and the opposite cut end planar surfaces of the material being drawn towards each other and butt-joined by a splicer. The improvement resides in a splicer having a lateral movement device that is movable in a direction parallel to a shaft of the drum, a press device supported by the lateral movement device, and a splice roller pivotably supported at the bottom end of the press device. Also, the improvement resides in the splice roller being in the form of a roller tapered in its radial direction, spring discs fixedly secured to the opposite sides of the tapered roller in which radial slits extend in their outer circumferential portions, and the outer circumferential portions tapered inclined towards the tapered roller. The device of the present invention maintains constant the force for drawing opposed ends of the wrapped material on the drum towards each other.

1 Claim, 5 Drawing Sheets

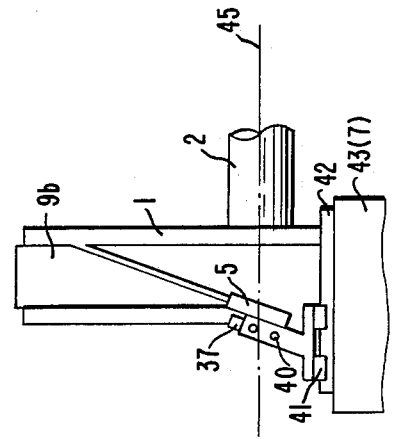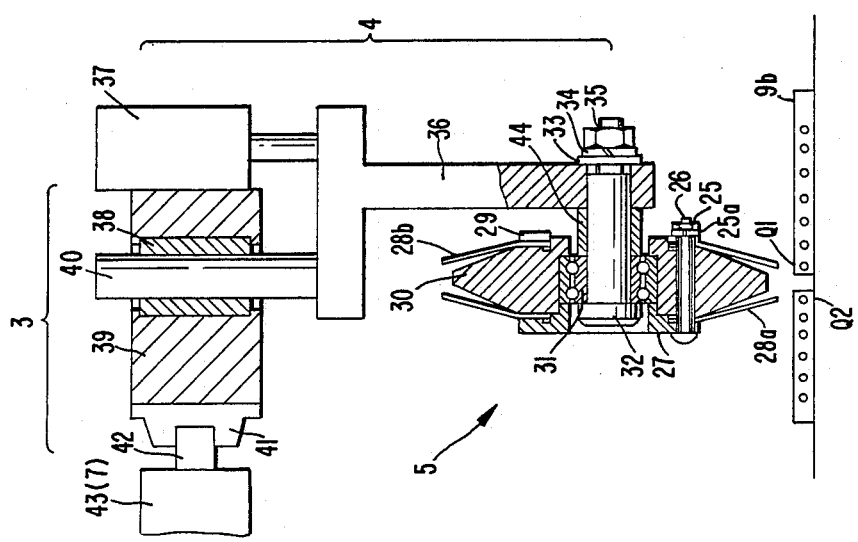

JOINING DEVICE FOR CORD-REINFORCED BELT-SHAPED MATERIALS

BACKGROUND OF THE INVENTION

1. Field of the Invention

The present invention relates to an automatic joining device in a material applying apparatus of a tire fabricating machine, and more particularly to a joining device (automatic splicer) for joining ends of materials cut by a bias cutter.

2. Description of the Prior Art

In a tire fabricating machine, various rubber materials are normally fed to a cylindrical drum in the form of belts. The belt-shaped material is cut into a unit length and, on the above-mentioned cylindrical drum, the front end and the rear end of the cut length of material must be joined. Among the methods of joining cord-reinforced material such as breaker, the joining of the front end and the rear end in an overlapped state (lap-joint: FIG. 7) is not favored, but in many cases the joining of the cut planar surfaces of the front and rear ends butted against each other (butt-joint: FIG. 8) is required.

Such joining was normally carried out manually, but according to the demand for automation a number of automated devices have been proposed.

In a representative device that was proposed in the prior art, as shown in FIG. 9, material 2' cut into a length somewhat shorter than the length of one turn of drum 1' is placed on a conveyor 3' for conveying materials. The material 2' is pressed against the drum 1', and butt-joining is effected by slowing down the feed speed of the conveyor relatively to the rotational speed of the drum to the extent of the aforementioned somewhat shorter length.

In addition, a method for resolving the problem of a divergence of the ends at the joining portion is disclosed in Japanese Patent Application No. 61-144968 (1986).

The invention disclosed in Japanese Patent Application No. 61-144968 (1986) will be described with reference to FIG. 10.

In FIG. 10, reference numeral 01 designates a wrapping drum, number 02 designates a wrapping surface of the wrapping drum, number 04 designates a raw material application conveyor, numeral 05 designates a raw material measuring and transporting conveyor, numeral 024 designates an automatic splicer, numerals 022 and 026 designate magnets, numeral 025 designates a slide frame, numeral 027 designates a press plate, reference character $M_1$ designates cut raw material, reference character $M_2$ designates a front end of the cut raw material, the reference character $M_3$ designates a rear end of the cut raw material.

The above-described apparatus is similar to that shown in FIG. 9 with respect to the wrapping of raw material around the forming drum 01 by means of the raw material application conveyor 04, and is provided with a joining device 024 (automatic splicer) for bringing spaced ends of the material into a butted state after the wrapping thereof over the drum.

The structure of the automatic splicer 024 is shown in FIGS. 11 and 12. Two sets of guide rollers 110 are mounted to a bracket 111, and these guide rollers are adapted to be moved close to or away from the drum 01 by means of a drive cylinder 115. In addition, separately from the guide rollers 110, a splice roller 106 is mounted on a bracket 107, and this splice roll 106 is movable close to or away from the drum 01 by means of a drive cylinder 109. Both brackets 111, 107 are mounted to brackets 104 and 105, and this assembly is freely movable in the direction of the drum axis as guided by a shaft 102 via a linear bearing 103. The splice roller 106 is mounted at an angle with respect to the guide roll 110 so as to assume a diverging attitude as shown in FIG. 12.

After the material has been wrapped around the cylindrical drum surface by means of the conveyor, as shown in FIG. 13, both rollers 110 and 106 are pressed against the material so that a joining portion is located between the guide rollers 110 and the splice roller 106. Thereafter, when the drum 01 is rotated, the entire assembly is moved along the axis of the drum by the guide rollers 110. Meanwhile, the side $M_3$ of the open-end material is drawn towards the side $M_2$ by the action of the splice roller 106, and thus the cut planar surfaces of the respective sides are joined to each other.

With the above-described device relying upon the splice roller and the guide rollers in the prior art, the force exerted by the splice roller to narrow the gap between the respective cut ends would tend to divert the guide rollers from the direction in which they should advance. Consequently, it is difficult to move both rollers while holding the joining portion between the guide rollers and the splice roller. In addition, despite the fact that the opening width may be different in various applications, the amount of the material drawn by the splice roller is constant, and so, unless the opening width at the time of the initial wrapping is limited to a certain extent, good joining cannot be attained.

If the interval between the guide rollers and the splice roller is increased for the purpose of facilitating a position setting of the ends of the cut material, the joining of the materials becomes difficult. In practice, the roller interval is about 2-3 mm, and it is difficult to set the ends in position so that the joining portion has such an interval.

SUMMARY OF THE INVENTION

It is therefore one object of the present invention to provide an improved joining device for cord-reinforced belt-shaped materials in which the latitude for an interval between opposed ends of initially wrapped material on a drum is great and requirements for initially wrapping belt-shaped material on a drum are mitigated.

Another object of the present invention is to provide a joining device for cord-reinforced belt-shaped materials which can operate on various materials.

According to one basic feature of the present invention, the aforementioned objects can be achieved by maintaining constant the force for drawing opposed ends of initially wrapped material on a drum towards each other by making use of a spring, in contrast to the fact that in the known device in the prior art the amount of the drawing of opposed ends of initially wrapped material on a drum towards each other is constant.

According to another specific feature of the present invention, there is provided a joining device for cord-reinforced belt-shaped materials in which: elastic belt-shaped material having a large number of cords embedded therein at equal intervals with a predetermined inclination angle is cut in the direction of the cords into a length somewhat shorter than an outer circumferential length of a drum to be fed the belt-shaped material; thereafter the cut length is wrapped around the outer circumference of the drum, and the opposite cut end planar surfaces are drawn towards each other and butt-joined by means of a splicer. The splicer comprises lateral movement means that is movable in a direction parallel to a shaft of the drum, press means supported by the lateral movement means and a splice roller pivotably supported at the bottom end of the press means. The splice roller is tapered in its radial direction. And, spring discs are fixedly secured to the opposite sides of the tapered roller and have radial slits at their outer circumferential portions, which outer circumferential portions are inclined towards the same tapered roller.

According to the present invention as features above, due to the fact that the force for drawing the opposed ends of initially wrapped material on a drum towards each other is maintained constant, the latitude of an interval between opposed ends initially wrapped material on a drum can be relatively great, and the requirements for initial wrapping the belt-shaped material on a drum can be mitigated.

Furthermore, since the drawing force is maintained constant, excessive drawing of the ends of the material does not occur, and the drawing force is dependent on the rigidity of the material. Thus, the same joining device can operate on various of materials. Because the structure having no directionality for the traveling direction, position setting is easier than the joining device in the prior art.

The above-mentioned and other objects, features and advantages of the present invention will become more apparent from referring to the following description of one preferred embodiment of the invention taken in conjunction with the accompanying drawings.

BRIEF DESCRIPTION OF THE DRAWINGS

In the accompanying drawings:

FIG. 2 is an enlarged cross-sectional view of the splice roller shown in FIG. 1;

FIG. 3 is a top view of the location in the device in which the splice roller is disposed;

FIG. 4 is a side view of a spring disc of the splice roller;

DETAILED DESCRIPTION OF THE PREFERRED EMBODIMENT

Figure 1:
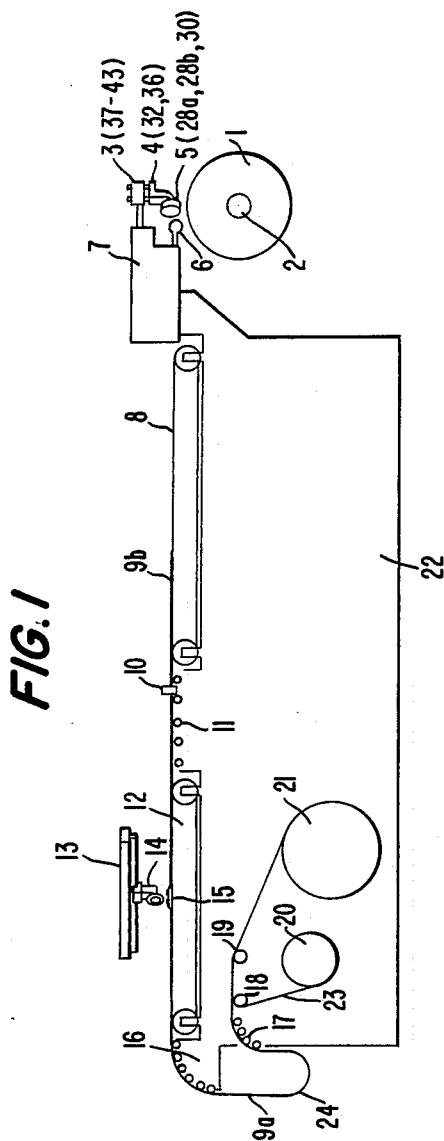
FIG. 1 is an overall side view of one preferred embodiment of the joining device for cord-reinforced belt-shaped materials according to the present invention.

In FIGS. 1 to 6, reference numeral 1 designates a cylindrical wrapping drum made of metal, numeral 2 designates a drive shaft of the cylindrical drum 1, numeral 3 designates lateral movement means mounted to a guide device 7, numeral 4 designates press means supported by the lateral movement means 3, numeral 5 designates a splice roller pivotably supported at the bottom of the press means 4, numeral 6 designates a press roller supported by a guide device 7, numeral 8 designates a conveyor, numerals 9a and 9b respectively designate material (cord-reinforced strips), numeral 10 designates traveling control means for the controlling the travel of the materials 9a and 9b, numeral 11 designates a roller conveyor, numeral 12 designates a cut conveyor, numeral 13 designates a cutter guide rail, numeral 14 designates a cutter, numeral 15 designates a cutter cradle, numerals 16 and 17 respectively designate roller conveyors, numerals 18 and 19 respectively designate guide rollers, numeral 20 designates a liner roll, numeral 21 designates a stock roll, numeral 22 designates a machine frame, numeral 23 designates a liner, numeral 24 designates a face turn, numerals 25 and 26 designate a bolt and a nut, respectively, numeral 25a designates a washer, numerals 27 and 29 designate press plates, numerals 28a and 28b designate spring discs, numeral 30 designates a roller, numeral 31 designates a bearing, numeral 32 designates a shaft, numerals 33 and 34 respectively designate washers, numeral 35 designates a nut, numeral 36 designated a bracket, numeral 37 designates a hydraulic drive cylinder, numeral 38 designates a linear bearing for slidably supporting a slide shaft 40, numeral 39 designates a block for supporting the cylinder 37, numeral 40 designates a slide shaft provided on the bracket 36 and projecting therefrom, numeral 41 designates a guide bearing mounted to the block 39, numeral 42 designates a rail for guiding the guide bearing 41, numeral 43 designates a rail mount seat, numeral 44 designates a collar, numeral 45 designates an axis of the cylindrical drum 1, numeral 46 designates radial slots provided at the peripheral portions of the spring discs 28a and 28b, reference character $Q_1$ designates a rear end cut planar surface of the material 9b, and character $Q_2$ designates a front end cut planar surface of the material 9b.

In the overall side view shown in FIG. 1, the material 9b wound jointly with the liner 23 around the stock roll 21 is paid off to the rollers 18 and 19, the liner 23 and the material 9a are torn at the location of the roller 18, and the liner 23 is wound around the liner roll 20. The material 9a passes through the roller conveyor 17, and it is guided by the roller conveyor 16 past the face turn 24 and is introduced into the cut conveyor 12. In the cut conveyor 12, the fed material 9a travels over the cutter cradle 15 disposed on the conveyor and is fed towards the drum 1. The material is delivered from the cutter cradle 15 in unit lengths, that is, in lengths somewhat shorter than the circumference of the drum, by being cut by the cutter 14. The cut material 9b is further delivered continuously, and at the moment when the cut portion has been sent onto the roller conveyor 11, the delivery operation is once stopped. In the delivery operation up to this stage, the conveyors 12 and 8 are synchronously driven so that the delivery speed is constant, but after the cut portion has been delivered to the roller conveyor 11 and has been stopped, the conveyor 12 is stopped and only the conveyor 8 is driven. In this way, only the material 9b cut into one unit length is sent towards the drum 1. The material 9b sent by the conveyor 8 is paid off onto the drum 1 while it is being positioned by the guide device 7 so that the center of the material coincides with the center of the drum. The paid-off material 9b is wrapped around the drum 1 while being tightly pressed against the surface of the drum 1 by means of the press roller 6. To the front end of the guide device 7 is mounted a splice roller 5 via lateral movement means 3 and press means 4. Since the material 9b has been cut into a length somewhat shorter than the circumference of the drum 1 as described previously, after wrapping the front end cut planar surface and the rear end cut planar surface of the material are exposed. These end portions are butt-joined by means of the splice roller 5.

Details of the splice roller 5 are shown in FIG. 2. As shown in FIG. 3, the splice roller 5 is mounted at an inclined attitude with respect to the axis 45 of the drum, and this inclination angle coincides with the inclination angle of the cords in the material 9b. The splice roller 5 is urged against the material 9b by the hydraulic cylinder 37, and if the drum 1 is rotated under this condition, then the splice rollers 5 moves in the direction of the axis 45 as guided by the rail 42 due to a component force directed in the direction of the axis 45 caused by the inclined mounting of the splice roller 5.

FIG. 4 is a side view of the spring disc 28a. The spring discs 28a and 28b respectively have radial slits 46 formed at equal angular intervals as shown in FIG. 4. The discs themselves have their outside portions bent by a certain angle towards the center of the roller as shown in FIG. 2.

The detailed structure of the splice roller 5 is shown in FIG. 2. Finger plates for drawing closer the opening edges of the material consist of the two spring discs 28a and 28b. These spring discs are clamped on the opposite surfaces of the roller 30 tapered in its radial direction by means of the respective press plates 27 and 29 and have tip ends which are disposed close to each other, and are fixed in position by means of the bolts 26, the nuts 25 and the washers 25a. The roller 30 is mounted on the shaft 32 via the bearing 31. And, the shaft 32 is fixedly secured to the bracket 36 by means of the nut 35 and the washers 33 and 34. Reference numeral 44 designates collars for setting the position of the roller 30. To the bracket 36 is fixedly secured a slide shaft 40. This shaft is slidably mounted to the block 39 via the linear bearing 38. Reference numeral 37 designates a hydraulic drive cylinder, which operates to urge the splice roller 5 against the drum 1 or separate the splice roller 5 from the drum 1. The block 39 is mounted so as to be slidable in the axial direction of the drum as guided by the rail 42 via the guide bearing 41. The seat to which the rail 42 is mounted is the mount surface provided on the guide device 7 in FIG. 1.

Accordingly, the members 38, 39, 41, 42 and 43 and the members 36, 37 and 40 in FIGS. 2 and 3 respectively form the lateral movement means 3 and the press means 4 in FIG. 1.

The material 9b being wrapped around the drum 1 defines a gap between its front end cut planar surface $Q_2$ and its rear end cut planar surface $Q_1$, as shown in FIG. 2. Here, after a position setting operation has been performed so that the gap is located between the discs 28a and 28b, the splice roller 5 is urged against the material 9b by means of the hydraulic cylinder 37.

Figure 5:
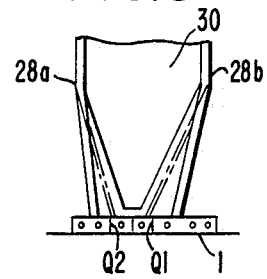
FIGS. 5 and 6 are cross-sectional views of portions of the spring discs urging the front and rear end cut planar surfaces of the material toward each other.
Figure 6:
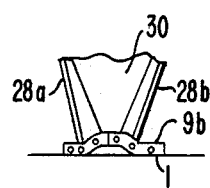
Figure 7:
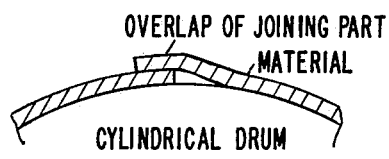
FIG. 7 is a schematic cross-sectional view of a lap-joint.
Figure 8:
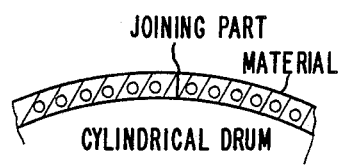
FIG. 8 is a schematic cross-sectional view of a butt-joint.
Figure 9:
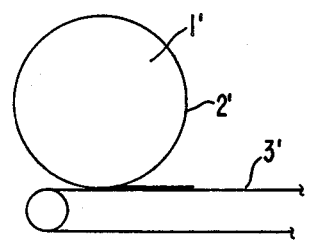
FIG. 9 is a schematic view of a known device in the prior art.
Figure 10:
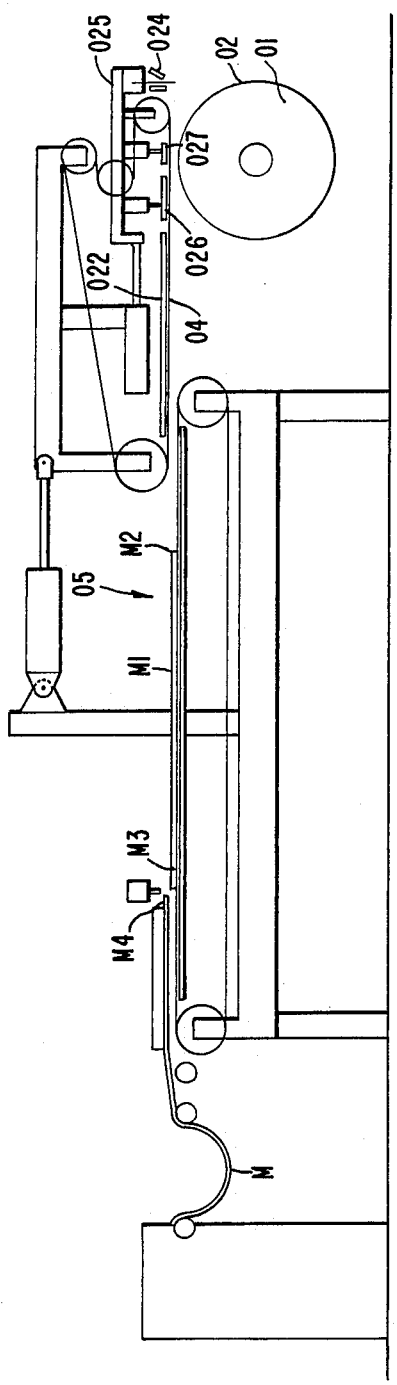
FIG. 10 is an overall side view of another known device in the prior art.
Figure 12:
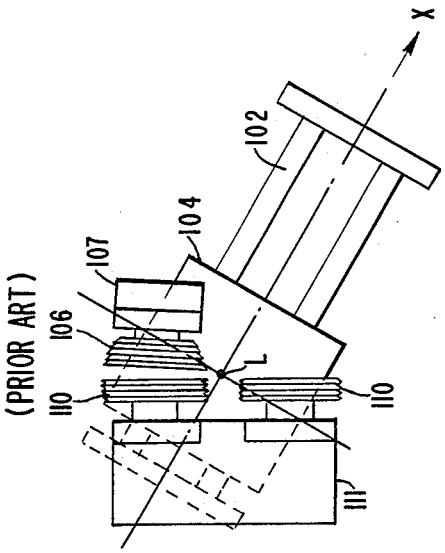
FIGS. 11 and 12 are a side view and a bottom view, respectively, of the automatic splicer shown in FIG. 10.
Figure 13:
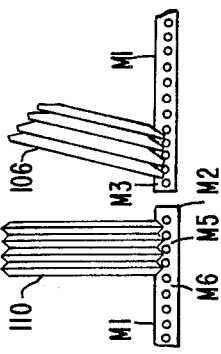
FIG. 13 is a schematic view of the automatic splicer shown in FIG. 11 and illustrating the operation thereof.
Figure 11:
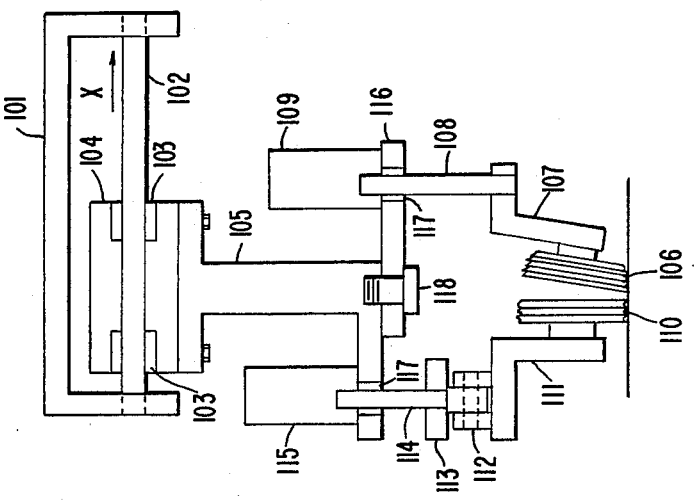

The tip ends of the discs 28a and 28b bite in the material 9b and simultaneously bend towards the center of the roller as a result of being urged against the material 9b, and thus draw the cut end planar surfaces $Q_1$ and $Q_2$ closer towards the center as shown in FIG. 5. Under this condition, if the drum 1 is rotated, the discs 28a and 28b rotate while drawing closer the materials successively, and the entire assembly moves in the direction of the axis 45. In this way, a butt-joint is completed at the initially spaced joining portion. The air space just after the wrapping is limited to a certain extent by the gap between the tip ends of the discs 28a and 28b under a free condition, and in the event that the gap of the opening portion of the material is too narrow, the material would be inflated after being joined. However, since the planar portion at the tip end of the roller 30 would restrain the amount of inflation, the joined condition would not be damaged thereby. Such a condition is illustrated in FIG. 6. In addition, the drawing force can be preset to an appropriate magnitude by regulating the hydraulic pressure applied to the hydraulic cylinder 37.

As will be obvious from the above description, according to the present invention the following advantages can be attained:

(1) Due to the fact that the drawing of the edges of the wrapped material is effected on the basis of the drawing force rather than the drawing distance, an unsatisfactory joint caused by excessive drawing does not arise. And at the same time, the latitude in the opening width of the wrapped material is great as compared to that allowed for in the similar joining device of the prior art.

(2) Since the interval between the outer edges of the two spring discs can be large, positioning of the splice roller at the start of splicing is easy.

(3) Since the drawing is effected with equal forces from both sides, a disturbance would rarely occur in the advancing direction, and the present invention is highly reliable.

While a principle of the present invention has been described above in connection with one preferred embodiment of the invention, it is a matter of course that many apparently widely different embodiments of the present invention could be made without departing from the spirit of the present invention.

What is claimed is:

1. A joining device for joining ends of elastic belt-shaped material, said device comprising:

a wrapping drum; and a splicer confronting said wrapping drum for joining spaced apart opposing ends of elastic belt-shaped material wrapped around said drum, said splicer including a splicing roller rotatably supported in the device, said splicer roller having an outer circumferential contact surface and tapered in a radial direction extending from the center thereof toward said circumferential contact surface, spring discs fixedly secured to said roller at opposite sides of said roller, said spring discs having outer circumferential portions extending toward one another from respective central portions of the spring discs and terminating at outer peripheries of the spring discs located radially outwardly of said roller such that the spacing between said spring discs at the central portions thereof is greater than the spacing between said spring discs at the outer peripheries thereof, said spring discs having slits extending radially therein at said outer circumferential portions, and said spring discs exhibiting resiliency which allows said outer peripheries thereof to be resiliently bendable toward one another, press means connected to said roller for moving said roller and said spring discs fixedly secured thereto toward and away from said wrapping drum, and lateral moving means connected to said roller for moving said roller and said spring discs fixedly secured thereto axially of said drum.

* * * * *